US012802236B2

(12) United States Patent
Hassbring

(10) Patent No.: US 12,802,236 B2
(45) Date of Patent: Nov. 17, 2026

(54) METHOD AND DEVICE FOR MASKING OBJECTS

(71) Applicant: Axis AB, Lund (SE)

(72) Inventor: Ludvig Hassbring, Lund (SE)

(73) Assignee: AXIS AB, Lund (SE)

( * ) Notice: Subject to any disclaimer, the term of this patent is extended or adjusted under 35 U.S.C. 154(b) by 267 days.

(21) Appl. No.: 18/895,723

(22) Filed: Sep. 25, 2024

(65) Prior Publication Data

US 2025/0131573 A1 Apr. 24, 2025

(30) Foreign Application Priority Data

Oct. 23, 2023 (EP) .................................... 23205193

(51) Int. Cl.

*G06T 7/12* (2017.01)
*G06T 3/40* (2006.01)
*G06V 10/764* (2022.01)

(52) U.S. Cl.

CPC .................. *G06T 7/12* (2017.01); *G06T 3/40* (2013.01); *G06V 10/764* (2022.01); *G06V 2201/07* (2022.01)

(58) Field of Classification Search

None

See application file for complete search history.

(56) References Cited

U.S. PATENT DOCUMENTS

2015/0085163 A1 3/2015 Aimi et al.
2015/0262368 A1* 9/2015 Irie ........................... G06T 7/11 382/173
2019/0045203 A1 2/2019 Varadarajan et al.

(Continued)

FOREIGN PATENT DOCUMENTS

WO 2021223073 A1 11/2021

OTHER PUBLICATIONS

Liu, S., Wang, T., Li, J., Sun, D., Srivastava, M., & Abdelzaher, T. (2022). AdaMask: Enabling Machine-Centric Video Streaming with Adaptive Frame Masking for DNN Inference Offloading. In Proceedings of the 30th ACM International Conference on Multimedia (pp. 3035-3044). Association for Computing Machinery.*

(Continued)

*Primary Examiner* — Andrew W Bee
*Assistant Examiner* — Christine Zhao
(74) *Attorney, Agent, or Firm* — Volpe Koenig

(57) ABSTRACT

An image processing device generates an output image with masking of objects of classes. An input image is downscaled to an object detection image having a lower resolution than the input image and lower than the output image. The object detection image is input to an object detection module and confidence scores for pixel areas are received from the object detection module. Each confidence score indicates a probability that the pixel area relates to an object to be masked. Based on the input image, an intermediate image is generated having a higher resolution than the object detection image resolution and an adaptive masking threshold is set such that the greater the ratio between the output image resolution and the object detection image resolution, the lower the masking threshold. The output image is then generated by masking pixel areas of the intermediate image.

13 Claims, 2 Drawing Sheets

(56) References Cited

U.S. PATENT DOCUMENTS

| | | | | |
|---|---|---|---|---|
| 2019/0303685 | A1 | 10/2019 | Nagao | |
| 2021/0142041 | A1 | 5/2021 | Lee et al. | |
| 2021/0185355 | A1 | 6/2021 | Edpalm et al. | |
| 2022/0147748 | A1* | 5/2022 | Nagori | G06N 3/045 |
| 2023/0108667 | A1 | 4/2023 | Hassbring et al. | |
| 2023/0111580 | A1* | 4/2023 | Takatsuka | G06T 1/20<br>348/222.1 |
| 2023/0282024 | A1* | 9/2023 | Lee | G06V 40/161<br>382/100 |

OTHER PUBLICATIONS

Monodepth, https://github.com/mrharicot/monodepth, Available at: https://web.archive.org/web/20180720055102/https://github.com/mrharicot/monodepth (Jul. 20, 2018).

Perspective Transformation, https://www.tutorialspoint.com/dip/perspective_transformation.htm, Available at: https://web.archive.org/web/20210923182533/https://www.tutorialspoint.com/dip/perspective_transformation.htm (Sep. 23, 2021).

[Updated] BodyPix: Real-time Person Segmentation in the Browser with TensorFlow.js, https://blog.tensorflow.org/2019/11/updated-bodypix-2.html, Available at: https://web.archive.org/web/20210128201702/https://blog.tensorflow.org/2019/11/updated-bodypix-2.html (Jan. 28, 2021).

Google Bodypix, https://github.com/tensorflow/tfjs-models/tree/master/body-pix, Available at: https://web.archive.org/web/20191011051625/https://github.com/tensorflow/tfjs-models/tree/master/body-pix (Oct. 11, 2019).

* cited by examiner

METHOD AND DEVICE FOR MASKING OBJECTS

FIELD OF INVENTION

The present disclosure relates to image processing, and specifically to generating an output image with masking of objects of classes to be masked.

TECHNICAL BACKGROUND

In video applications, it may be desired to be able to detect selected classes of objects so that they may be anonymized in the image or video. For example, if an operator is viewing a video stream from a surveillance camera, people, license plates or other objects should be detected and masked in the video image frames of the video stream such that the operator is not able to identify them when viewing the video stream. By the development of object detection modules e.g. using neural networks, such detection and masking of objects of the selected classes of objects in the video images frames of a video can now be made automatically in real time. However, as it is important to keep a high precision in the object detection to avoid unmasked objects that should have been masked, there are challenges in using automatic object detection since such automatic object detection may result in a reduced precision in some scenarios.

SUMMARY

An object of the present disclosure is to overcome or at least mitigate the problems and drawbacks of prior art.

According to a first aspect, a method is provided of generating an output image with masking of objects of classes to be masked. The method comprises downscaling an input image to an object detection image having a resolution lower than a resolution of the input image and lower than a resolution of the output image, and inputting the object detection image to an object detection module. The method further comprises receiving confidence scores for pixels or pixel areas of the object detection image from the object detection module. Each confidence score indicates a respective probability that the pixel or pixel area relates to an object of a class to be masked. The method further comprises generating an intermediate image based on the input image. The intermediate image has a resolution higher than the object detection image resolution. The method further comprises setting an adaptive masking threshold such that the greater the ratio between the output image resolution and the object detection image resolution, the lower the adaptive masking threshold, and generating the output image by masking pixels or pixel areas of the intermediate image corresponding to pixels or pixel areas of the object detection image having a confidence score higher than the adaptive masking threshold.

By setting the adaptive masking threshold based on the ratio between the output image resolution and the object detection image resolution, the masking threshold can be adapted in relation the increased risk that the object detection module does not detect an object of a class that should be masked in the object detection image. At the same time, an operator is able to identify that object in the output image if the object is not masked due to the higher resolution in the output image than in the object detection image. Specifically, by setting the adaptive masking threshold to a lower value the greater the ratio between the output image resolution and the object detection image resolution is, the adaptive masking threshold is set based on the increased risk with an increased ratio such that objects having lower confidence scores are masked. The capacity of an object detection module to detect an object of a class that should be masked in an image depends on the size of the object in the image used for object detection and the resolution of that image. Similarly, the ability of an operator to identify an object in an image depends also on the size of the object in the image displayed to the operator and the resolution of that image.

By downscaling is meant any way of reducing the number of pixels in the image and is not intended to encompass cropping.

The intermediate image may be generated by downscaling the input image to the intermediate image, wherein a resolution of the intermediate image is lower than the input image resolution. In alternative, intermediate image may be generated by using the input image as the intermediate image, wherein the intermediate image resolution is equal to the input image resolution.

The method may further comprise setting a fixed masking threshold independent of the ratio between the output image resolution and the object detection image resolution. For pixels or pixel areas corresponding to objects located closer than a preset distance generating, the output image is then generated by masking pixels or pixel areas of the intermediate image corresponding to pixels or pixel areas of the object detection image having a confidence score higher than the adaptive masking threshold. For pixels or pixel areas corresponding to objects located equal to or farther away than the preset distance, the output image is generated by masking pixels or pixel areas of the intermediate image corresponding to pixels or pixel areas of the object detection image having a confidence score higher than the fixed masking threshold.

It is to be noted that 'fixed' in fixed masking threshold is intended to indicate that it is not adapted in relation to the ratio between the output image resolution and the object detection image resolution. Adaptation of the fixed masking threshold in relation to other parameters is not excluded.

This enables using a fixed masking threshold, e.g. a masking threshold that would have been used without adaptation of the masking threshold in relation to the ratio, for objects located equal to or farther away than the preset distance. The preset distance may for example be a distance at which an operator will (or at least is assumed to) not be able to identify the object. For example, with a given resolution of images from a camera, an operator will not be able to identify a person located at a certain distance away from a camera since the person will be too small in the image such that the number of pixels across the persons face will be too small to enable the operator to recognize the features of the persons face. Using a fixed masking threshold for such distances is beneficial since the adaptive masking threshold will decrease the masking threshold in relation to the masking threshold that would have been used without adaptation of the masking threshold in relation to the ratio and will hence typically mask a number of objects that are not of a class that should be masked. Hence, unnecessary masking will be reduced. Furthermore, if the preset distance is set such that an operator will (or at least is assumed to) not be able to identify objects located at a distance equal to or further away than the preset distance, it would not matter if such objects were not masked even if they were of a class that should be masked. In alternative, for objects at a distance equal to or further away than the preset distance, masking may even be refrained from altogether.

In embodiments where the method further comprises setting a fixed masking threshold independent of the ratio between the output image resolution and the object detection image resolution two preset distances may be set, namely a preset distance and further preset distance, wherein the further preset distance is closer than the preset distance. For pixels or pixel areas corresponding to objects located closer than the preset distance and farther away than the further preset distance, the output image is generated by masking pixels or pixel areas of the intermediate image corresponding to pixels or pixel areas of the object detection image having a confidence score higher than the adaptive masking threshold. For pixels or pixel areas corresponding to objects located equal to or farther away than the preset distance, or equal to or closer than the further preset distance, the output image is generated by masking pixels or pixel areas of the intermediate image corresponding to pixels or pixel areas of the object detection image having a confidence score higher than the fixed masking threshold.

This enables using a fixed masking threshold, e.g. the masking threshold that would have been used without adaptation of the masking threshold in relation to the ratio, for objects located equal to or farther away than the preset distance. The preset distance may for example be a distance at which an operator will (or at least is assumed to) not be able to identify the object. For example, with a given resolution of the output image, an operator will not be able to identify a person located at a certain distance away from a camera capturing an image on which the output image is based since the person will be to small in the image such that the number of pixels across the persons face will be to small to enable the operator to recognize the features of the persons face. Using a fixed masking threshold for such distances is beneficial since the adaptive masking threshold will decrease the masking threshold in relation to the masking threshold that would have been used without adaptation of the masking threshold in relation to the ratio and will hence typically mask a number of objects that are not of a class that should be masked. Hence, unnecessary masking may be reduced. Furthermore, if the preset distance is set such that an operator will (or at least is assumed to) not be able to identify objects located at a distance equal to or further away than the preset distance, it would not matter if such objects were not masked even if they were of a class that should be masked. In alternative, for objects at a distance equal to or further away than the preset distance, masking may even be refrained from altogether.

Additionally, this enables using a fixed masking threshold, e.g. the masking threshold that would have been used without adaptation of the masking threshold in relation to the ratio, for objects located equal to or closer than the further preset distance. The further preset distance may for example be a distance at which the object detection module will (or at least is assumed to) be able to detect the object. For example, with a given resolution of the object detection image, the object detection module will be able to detect a person located at a certain distance away from a camera capturing an image on which the object detection images is based since the person will be large enough in the image such that the number of pixels across the persons face will be large enough to enable the object detection module to recognize that the object is a person that should be masked. Using a fixed masking threshold for such distances is beneficial since the adaptive masking threshold will decrease the masking threshold in relation to the masking threshold that would have been used without adaptation of the masking threshold in relation to the ratio and will hence typically mask a number of objects that are not of a class that should be masked. Hence, unnecessary masking may be reduced.

In embodiments where the method further comprises setting a fixed masking threshold independent of the ratio between the output image resolution and the object detection image resolution a preset pixel density may be set. For pixels or pixel areas corresponding to objects having a pixel density in the intermediate image above the preset pixel density, the output image by masking pixels or pixel areas of the intermediate image corresponding to pixels or pixel areas of the object detection image having a confidence score higher than the adaptive masking threshold. For pixels or pixel areas corresponding to objects having a pixel density in the intermediate image equal to or lower than the preset pixel density, the output image is generated by masking pixels or pixel areas of the intermediate image corresponding to pixels or pixel areas of the object detection image having a confidence score higher than the fixed masking threshold.

Pixel density here is defined as number of horizontal pixels over a width of an object or number of pixels per length (e.g. cm) where the length is the actual length of the object in real life. In the latter case, the actual size of the object needs to be determined. For example, this can be determined via a preliminary classification of the object.

This enables using a fixed masking threshold, e.g. the masking threshold that would have been used without adaptation of the masking threshold in relation to the ratio, for objects having a pixel density below or equal to the preset pixel density. The preset pixel density may for example be a pixel density at which an operator will (or at least is assumed to) not be able to identify the object. For example, an operator will not be able to identify a person if the pixel density is too small to enable the operator to recognize the features of the persons face. Using a fixed masking threshold for such distances is beneficial since the adaptive masking threshold will decrease the masking threshold in relation to the masking threshold that would have been used without adaptation of the masking threshold in relation to the ratio and will hence typically mask a number of objects that are not of a class that should be masked. Hence, unnecessary masking will be reduced. Furthermore, if the preset pixel density is set such that an operator will (or at least is assumed to) not be able to identify objects having a pixel density equal to or below the preset pixel density, it would not matter if such objects were not masked even if they were of a class that should be masked. In alternative, for objects having a pixel density equal to or below the preset pixel density, masking may even be refrained from altogether.

Furthermore, in embodiments where the method further comprises setting a fixed masking threshold independent of the ratio between the output image resolution and the object detection image resolution two preset pixel densities may be set, namely a preset pixel density and a further preset density, wherein the further preset pixel density is higher than the preset pixel density. For pixels or pixel areas corresponding to objects having a pixel density in the object detection image above a preset pixel density and below a further preset pixel density, the output image is generated by masking pixels or pixel areas of the intermediate image corresponding to pixels or pixel areas of the object detection image having a confidence score higher than the adaptive masking threshold. For pixels or pixel areas corresponding to objects having a pixel density in the object detection image equal to or lower than the preset pixel density, or equal to or higher than the further preset pixel density, the output image is generated by masking pixels or pixel areas of the intermediate image corresponding to pixels or pixel areas of the object detection image having a confidence score higher than the fixed masking threshold.

This enables using a fixed masking threshold, e.g. the masking threshold that would have been used without adaptation of the masking threshold in relation to the ratio, for objects having a pixel density below or equal to the preset pixel density. The preset pixel density may for example be a pixel density at which an operator will (or at least is assumed to) not be able to identify the object. For example, an operator will not be able to identify a person if the pixel density is small to enable the operator to recognize the features of the persons face. Using a fixed masking threshold for such distances is beneficial since the adaptive masking threshold will decrease the masking threshold in relation to the masking threshold that would have been used without adaptation of the masking threshold in relation to the ratio and will hence typically mask a number of objects that are not of a class that should be masked. Hence, unnecessary masking will be reduced. Furthermore, if the preset pixel density is set such that an operator will (or at least is assumed to) not be able to identify objects having a pixel density equal to or below the preset pixel density, it would not matter if such objects were not masked even if they were of a class that should be masked. In alternative, for objects having a pixel density equal to or below the preset pixel density, masking may even be refrained from altogether.

Additionally, this enables using a fixed masking threshold, e.g. the masking threshold that would have been used without adaptation of the masking threshold in relation to the ratio, for objects having a pixel density equal to or higher than the further preset pixel density. The further preset pixel density may for example be a pixel density at which the object detection module will (or at least is assumed to) be able to detect the object. For example, at a pixel density equal to or larger than the further preset pixel density, the number of pixels across the persons face will be large enough to enable the object detection module to recognize that the object is a person that should be masked. Using a fixed masking threshold for such distances is beneficial since the adaptive masking threshold will decrease the masking threshold in relation to the masking threshold that would have been used without adaptation of the masking threshold in relation to the ratio and will hence typically mask a number of objects that are not of a class that should be masked. Hence, unnecessary masking may be reduced.

The method may further comprise downscaling the input image to an intermediate image having a resolution lower than the input image resolution. Generating the output image then comprises generating the output image by masking pixels or pixel areas of the intermediate image corresponding to pixels or pixel areas of the object detection image having a confidence score higher than the adaptive masking threshold.

According to a second aspect, a non-transitory computer readable storage medium is provided having stored thereon instructions for implementing the method of the first aspect, when executed in an apparatus having processing capabilities.

The above-mentioned optional additional features of the method of the first aspect, when applicable, apply to the non-transitory computer readable storage medium according to the second aspect as well. In order to avoid undue repetition, reference is made to the above.

According to a third aspect, an image processing device is provided for generating an output image with masking of objects of classes to be masked. The image processing device comprises circuitry configured to execute a downscaling function, an imputing function, a receiving function, a first generating function, a setting function, and a second generating function. The downscaling function is configured to downscale an input image to an object detection image having a resolution lower than the input image resolution and lower than a resolution of the output image. The inputting function is configured to input the object detection image to an object detection module. The receiving function is configured to receive, from the object detection module, confidence scores for pixels or pixel areas of the object detection image, each confidence score indicating a respective probability that the pixel or pixel area relates to an object of a class to be masked. The first generating function is configured to generate, based on the input image, an intermediate image having a resolution higher than the object detection image resolution. The setting function is configured to set an adaptive masking threshold such that the greater a ratio between the output image resolution and the object detection image resolution, the lower the masking threshold. The second generating function is configured to generate the output image by masking pixels or pixel areas of the intermediate image corresponding to pixels or pixel areas of the object detection image having a confidence score higher than the adaptive masking threshold.

The above-mentioned optional additional features of the method of the first aspect, when applicable, apply to the image processing device according to the third aspect as well. In order to avoid undue repetition, reference is made to the above.

A further scope of applicability of the present invention will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF DRAWINGS

The above and other aspects of the present disclosure will now be described in more detail, with reference to appended figures. The figures should not be considered limiting but are instead used for explaining and understanding.

DETAILED DESCRIPTION

The present disclosure will now be described with reference to the accompanying drawings, in which currently preferred embodiments of the disclosure are illustrated. This disclosure may, however, be embodied in many different forms and should not be construed as limited to the embodiments set forth herein.

Figure 1:
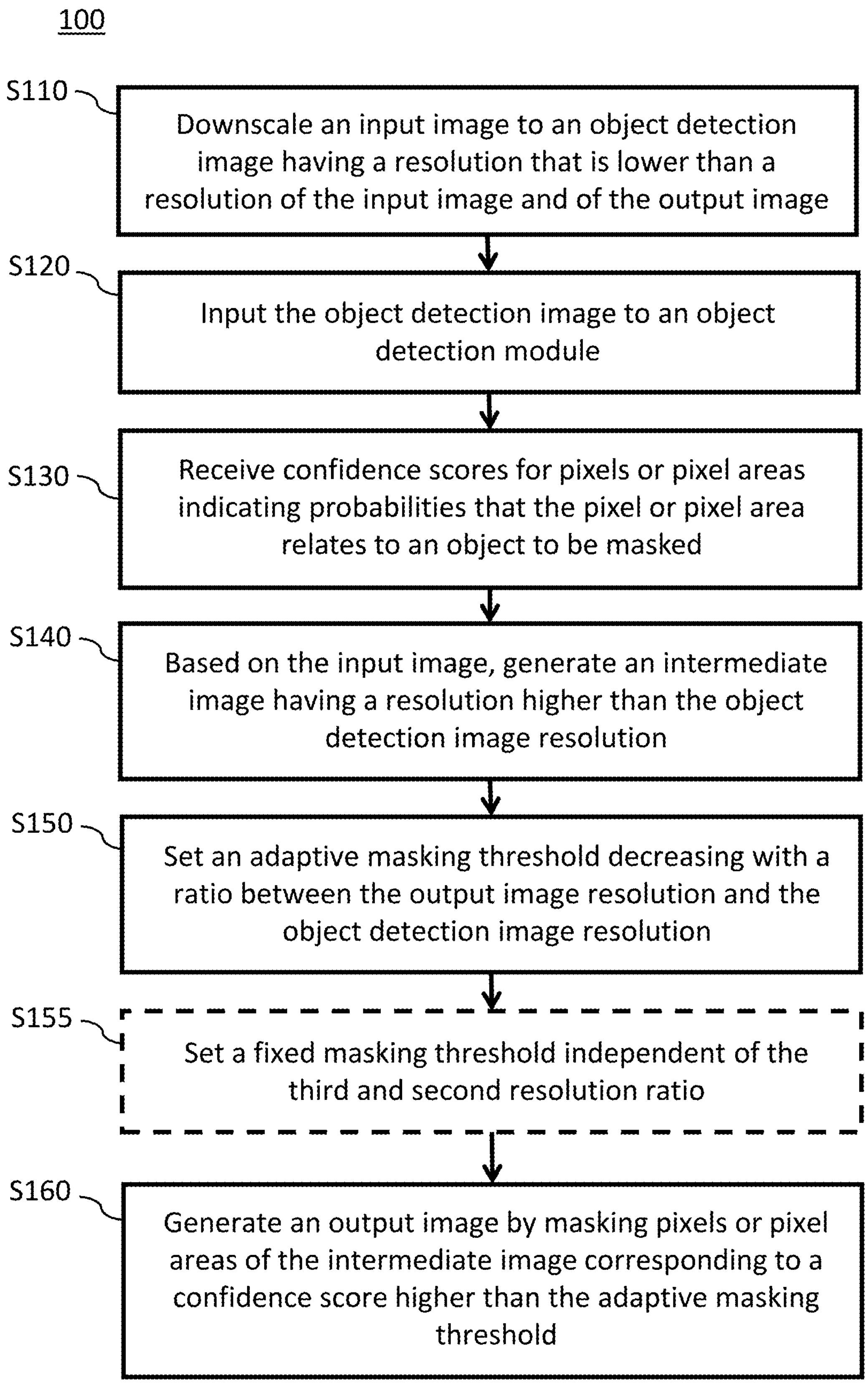
FIG. 1 shows a flow chart in relation to embodiments of a method of generating an output image with masking of objects of classes to be masked.

Embodiments of a method 100 of generating an output image with masking of objects of classes to be masked will now be described in relation to the flow chart in FIG. 1.

Embodiments of the method 100 are applicable in scenarios where an operator is viewing an image where objects of one or more classes are to be masked, e.g. due to maintain privacy or for other reasons. The image may be an image frame of a video stream. The classes of objects may for example be a person, a vehicle including a license plate, or other class of objects that can reveal a person's identity if they are possible to identify in the image. The image may be provided in real time from a camera capturing the image for viewing by an operator, or the image may be provided in any other way such that detection of objects to be masked in the image needs to be performed in real time or within a limited time period before a masked version of the image is to be provided for viewing by the operator.

The method 100 comprises downscaling S110 an input image to an object detection image having a resolution lower than a resolution of the input image. The input image may for example be an image as captured by a camera or it may be a processed version of the image as captured by a camera. The downscaling may for example be performed in order for an object detection module to be able to process the object detection image within a required period of time. For example, if the input image has a high resolution, such as 4K or above, the object detection module may not be able to process such a high-resolution image within a required period of time. Thus, this would introduce delays which may be undesirable or even detrimental in the specific application.

The object detection image is then inputted S120 to the object detection module, and confidence scores for pixels or pixel areas of the object detection image are received S130 from the object detection module. Each confidence score indicates a respective probability that the pixel within an object of a class to be masked or the pixel area corresponds to an object of a class to be masked. The alternatives pixel and pixel area relate to whether the object detection module provides a confidence score for each pixel of the image or if the object detection module provides confidence scores for each of a set of pixel areas of the image, such as bounding boxes in relation to possible object detections.

The object detection module may be based on any kind of object detection algorithm that provides confidence scores for pixels or pixel areas of an image. For example, the object detection module may be based on a neural network, such as a convolutional neural network. In another example, the object detection may be based on transformers, see e.g. https://en.wikipedia.org/wiki/Transformer_(machine_learning_model).

Based on the input image, an intermediate image having a resolution higher than the object detection image resolution is generated S140. The intermediate image is to be used to generate an output image in which objects of classes to be masked are masked, e.g. for display to an operator.

The intermediate image may be generated by downscaling the input image. The intermediate image resolution is then lower than the input image resolution. This may be the case if the image provided to an operator should for viewing should be of a lower resolution than the resolution of the input image, such as due to display resolution, transmission bitrate, storage space, or other reasons.

In alternative, the input image may be the same as the intermediate image or a processed version of the input image without any change of resolution such that the intermediate image resolution is equal to the input image resolution.

Furthermore, the intermediate image may be generated by cropping of the input image. This may be done both in the case when the object detection image is both a downscaled and cropped version of the input image, and in the case when the object detection is not produced using cropping of the input image. In both cases the output image will correspond to the cropped portion of the input image the resolution of the output image should be of the cropped portion as compared to the resolution of the corresponding portion of the object detection image.

Furthermore, an adaptive masking threshold is set S150 such that the greater a ratio between the output image resolution and the object detection resolution, the lower the masking threshold. An output image is then generated S160 by masking pixels or pixel areas of the intermediate image corresponding to pixels or pixel areas of the object detection image having a confidence score higher than the adaptive masking threshold. As the output image is generated by masking pixels or pixel areas of the intermediate image, the output image resolution is the same as the intermediate image resolution.

Setting the adaptive masking threshold as defined by the method 100 is based on an understanding that with an increasing ratio, more objects of a class that should be masked will be possible to identify by an operator at the output image resolution whilst at the same time will not be possible to detect by the object detection module at the object detection image resolution. By 'being detected by the object detection module' here is meant that the confidence score of pixels of or a pixel area associated with the object is higher than a non-adaptive masking threshold that is set without taking a ratio into account.

The adaptive masking threshold T may be a linear function of the ratio r between the output image resolution and the object detection image resolution. For example, the adaptive masking threshold T may be determined as a reduction of a default masking threshold Td with a constant $\alpha$ times the ratio r, i.e., $T=Td-\alpha\cdot r$ (equation 1). The constant $\alpha$ will vary between different object detection modules, as some are better than others at detecting objects at a lower resolution.

If, for a given object detection module, we wish to decrease the default masking threshold Td by 20 steps (on a scale from 1-100) when the output image resolution is 3840×2160 and the object detection image resolution is 1024×576, i.e., r=14.0625, then equation 1 gives that a would be approximately 1.42.

If the adaptive masking threshold T would also be adaptive in relation to size so of an object the adaptive masking threshold of an object To may be determined as a reduction of a default masking threshold Td with a constant $\alpha$ times the ratio r divided by the a constant $\beta$ times the size so of the object, i.e., $To=Td-\alpha\cdot r/\beta\cdot so$ (equation 2). The constant $\beta$ will vary between different classes of objects, as the capability of the object detection module to detect an object of a given size will be different for different classes of objects.

The method 100 may further comprise setting S155 a fixed masking threshold independent of the ratio between the output image resolution and the object detection image resolution. This fixed masking threshold is to be used when the adaptive masking threshold is not used. The fixed masking threshold may correspond to the default masking threshold in equation 1 and equation 2 hereinabove. In such a case, the adaptive masking threshold would be according to the respective one of equation 1 and equation 2 and the fixed masking threshold would be the default masking threshold. It is to be noted that 'fixed' in fixed masking threshold is intended to indicate that it is not adapted in relation to the ratio between the output image resolution and the object detection image resolution. Adaptation of the fixed masking threshold in relation to other parameters is not excluded.

For example, the adaptive masking threshold may only be used in relation to objects located closer than a preset distance. In such a case, the output image may then be generated S160 differently for pixels or pixel areas corresponding to an object depending on if the object is closer than the preset distance or not. Specifically, for pixels or pixel areas corresponding to object located closer than the preset distance, the output image is generated by masking pixels or pixel areas of the intermediate image corresponding to pixels or pixel areas of the object having a confidence score higher than the adaptive masking threshold. For pixels or pixel areas corresponding to objects located equal to or farther away than the preset distance, the output image is generated by masking pixels or pixel areas of the intermediate image corresponding to pixels or pixel areas of the object having a confidence score higher than the fixed masking threshold. By 'closer than a preset distance' here is meant that the distance to the object from a camera capturing the image is closer than a preset distance. For example, the distance from the camera can be determined by means of distance sensor arranged at the camera, such as lidar or radar or any other class of distance sensor. In another example, the distance from the camera may be determined based on the focal length used when capturing the image, the size of the object or the size of a bounding box of the object in the image, and an assumed class of the object. Other examples are using neural networks (see e.g., https://github.com/mrharicot/monodepth) and using perspective transforms where a distance along a floor can be determined based on height of installation and field of view of a camera (see e.g., https://www.tutorialspoint.com/dip/perspective_transformation.htm).

The preset distance may for example be a distance at which an operator will (or at least is assumed to) not be able to identify the object. For example, with a given resolution of images from a camera, an operator will not be able to identify a person located at a certain distance away from a camera since the person will be to small in the image such that the number of pixels across the persons face will be to small to enable the operator to recognize the features of the persons face.

Furthermore, the adaptive masking threshold may only be used in relation to objects located further away than a further preset distance, wherein further preset distance is shorter than the preset distance. In such a case, the output image may then be generated S160 differently for pixels or pixel areas corresponding to an object depending on if the object is further away than the further preset distance or not. Specifically, for pixels or pixel areas corresponding to objects located farther away than the further preset distance, the output image is generated S160 by masking pixels or pixel areas of the intermediate image corresponding to pixels or pixel areas of the object detection image having a confidence score higher than the adaptive masking threshold. For pixels or pixel areas corresponding to objects located equal to or closer than the further preset distance, the output image is generated S160 by masking pixels or pixel areas of the intermediate image corresponding to pixels or pixel areas of the object detection image having a confidence score higher than the fixed masking threshold.

The further preset distance may for example be a distance at which the object detection module will (or at least is assumed to) be able to detect the object. For example, with a given resolution of the object detection image, the object detection module will be able to detect a person located at a certain distance away from a camera capturing an image on which the object detection images is based since the person will be large enough in the image such that the number of pixels across the persons face will be large enough to enable the object detection module to recognize that the object is a person that should be masked. The object detection module's ability to detect an object will vary for different cases based also on other parameters such as light conditions, pose of the object etc. Hence, difficulty of detection of objects will vary for different cases from low difficulty to high difficulty. The further preset distance may for example set such that the object detection module is able to detect the object at least for cases with medium difficulty of detection of objects.

The preset distance and the further preset distance may be used separately or together. In the latter case, for pixels or pixel areas corresponding to objects located closer than the preset distance and farther away than the further preset distance, the output image is generated S160 by masking pixels or pixel areas of the intermediate image corresponding to pixels or pixel areas of the object detection image having a confidence score higher than the adaptive masking threshold. For pixels or pixel areas corresponding to objects located equal to or farther away than the preset distance, or equal to or closer than the further preset distance, the output image is generated S160 by masking pixels or pixel areas of the intermediate image corresponding to pixels or pixel areas of the object detection image having a confidence score higher than the fixed masking threshold.

In another example, the adaptive masking threshold may only be used in relation to objects having a pixel density above a preset pixel density. In such a case, the output image may then be generated S160 differently for pixels or pixel areas corresponding to an object depending on if the object has a pixel density above the preset pixel density or not. Specifically, for pixels or pixel areas corresponding to objects having a pixel density in the intermediate image above a preset pixel density, the output image is generated S160 by masking pixels or pixel areas of the intermediate image corresponding to pixels or pixel areas of the object detection image having a confidence score higher than the adaptive masking threshold. For pixels or pixel areas corresponding to objects having a pixel density in the intermediate image equal to or lower than the preset pixel density, the output image is generated S160 by masking pixels or pixel areas of the intermediate image corresponding to pixels or pixel areas of the object detection image having a confidence score higher than the fixed masking threshold.

The preset pixel density may for example be a pixel density at which an operator will (or at least is assumed to) not be able to identify the object. For example, an operator will not be able to identify a person if the pixel density is too small to enable the operator to recognize the features of the persons face.

Furthermore, the adaptive masking threshold may only be used in relation to objects having a pixel density below a further preset pixel density, wherein the further preset pixel density is higher than the preset pixel density. In such a case, the output image may then be generated S160 differently for pixels or pixel areas corresponding to an object depending on if the object has a pixel density below the preset pixel density or not. Specifically, for pixels or pixel areas corresponding to objects having a pixel density in the object detection image above the preset pixel density and below a further preset pixel density, the output image is generated S160 by masking pixels or pixel areas of the intermediate image corresponding to pixels or pixel areas of the object detection image having a confidence score higher than the adaptive masking threshold. For pixels or pixel areas corresponding to objects having a pixel density in the object detection image equal to or lower than the preset pixel density, or equal to or higher than the further preset pixel density, the output image is generated S160 by masking pixels or pixel areas of the intermediate image corresponding to pixels or pixel areas of the object detection image having a confidence score higher than the fixed masking threshold.

The further preset pixel density may for example be a pixel density at which the object detection module will be able to detect the object. For example, at a pixel density equal to or larger than the further preset pixel density, the number of pixels across the persons face will be large enough to enable the object detection module to recognize that the object is a person that should be masked.

The preset pixel density and the further preset pixel density may be used separately or together. In the latter case, for pixels or pixel areas corresponding to objects having a pixel density in the object detection image above the preset pixel density and below the further preset pixel density, the output image is generated S160 by masking pixels or pixel areas of the intermediate image corresponding to pixels or pixel areas of the object detection image having a confidence score higher than the adaptive masking threshold, wherein the further preset pixel density is higher than the preset pixel density. For pixels or pixel areas corresponding to objects having a pixel density in the object detection image equal to or lower than the preset pixel density, or equal to or higher than the further preset pixel density, the output image is generated S160 by masking pixels or pixel areas of the intermediate image corresponding to pixels or pixel areas of the object detection image having a confidence score higher than the fixed masking threshold.

If the object detection module is based on a convolutional neural network, the convolutional neural network may be of any kind that can be trained and used to classify objects in an image into different object classes, such as car, person, bicycle etc. For example, Google Bodypix can be used (see https://github.com/tensorflow/tfjs-models/tree/master/body-pix and https://blog.tensorflow.org/2019/11/updated-bodypix-2.html) which is trained on the data set COCO.

Figure 2:
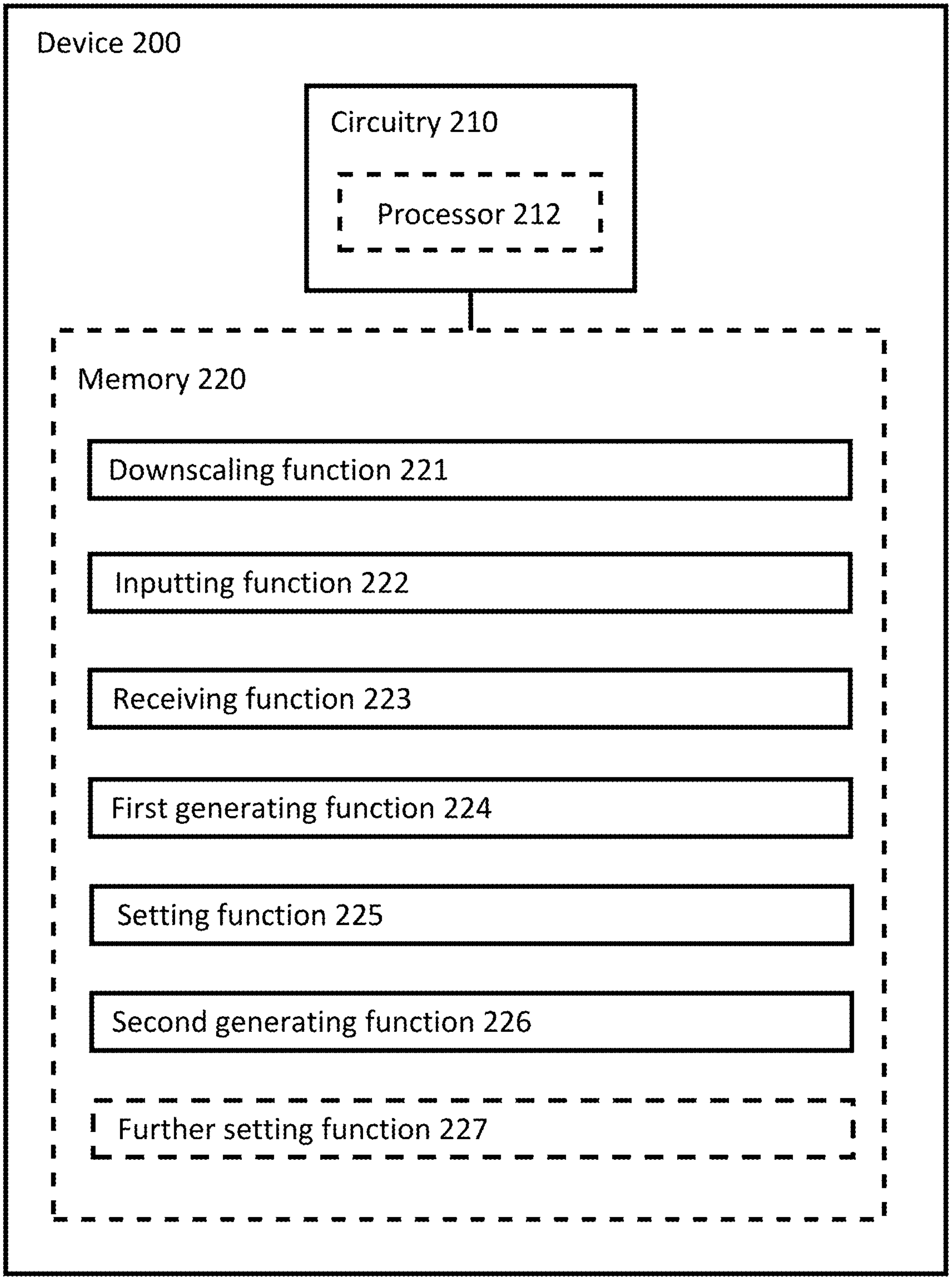
FIG. 2 shows a schematic diagram in relation to embodiments of an image processing device for generating an output image with masking of objects of classes to be masked.

FIG. 2 shows a block diagram in relation to embodiments of an image processing device for generating an output image with masking of objects of classes to be masked. The image processing device 200 may for example be a camera, be included in a camera or be connected to a camera for capturing the image.

The image processing device 200 comprises circuitry 210. The circuitry 210 is configured to carry out functions of the image processing device 200. The circuitry 210 may include a processor 212, such as for example a central processing unit (CPU), graphical processing unit (GPU), tensor processing unit (TPU), microcontroller, or microprocessor. The processor 212 is configured to execute program code. The program code may for example be configured to carry out the functions of the image processing device 200.

The image processing device 200 may further comprise a memory 220. The memory 220 may be one or more of a buffer, a flash memory, a hard drive, a removable media, a volatile memory, a non-volatile memory, a random access memory (RAM), or another suitable device. In a typical arrangement, the memory 220 may include a non-volatile memory for long term data storage and a volatile memory that functions as device memory for the circuitry 210. The memory 220 may exchange data with the circuitry 210 over a data bus. Accompanying control lines and an address bus between the memory 220 and the circuitry 210 also may be present.

Functions of the image processing device 200 may be embodied in the form of executable logic routines (e.g., lines of code, software programs, etc.) that are stored on a non-transitory computer readable medium (e.g., the memory 220) of the image processing device 200 and are executed by the circuitry 210 (e.g., using the processor 212). Furthermore, the functions of the sending device 200 may be a stand-alone software application or form a part of a software application that carries out additional tasks related to the image processing device 200. The described functions may be considered a method that a processing unit, e.g., the processor 212 of the circuitry 210 is configured to carry out. Also, while the described functions may be implemented in software, such functionality may as well be carried out via dedicated hardware or firmware, or some combination of hardware, firmware and/or software.

The circuitry 210 is configured to execute a downscaling function 221, an inputting function 222, a receiving function 223, a first generating function 224, a setting function 225, a second generating function 226, and optionally a further setting function 227.

The downscaling function 221 is configured to downscale an input image to an object detection image having a resolution lower than a resolution of the input image and lower than a resolution of the output image.

The inputting function 222 is configured to input the object detection image to an object detection module.

The receiving function 223 is configured to receive, from the object detection module, confidence scores for pixels or pixel areas of the object detection image, each confidence score indicating a respective probability that the pixel or pixel area relates to an object of a class to be masked.

The first generating function 224 is configured to generate, based on the input image, an intermediate image having a resolution higher than the object detection image resolution.

The setting function 225 is configured to set an adaptive masking threshold such that the greater a ratio between the output image resolution and the object detection image resolution, the lower the masking threshold.

The second generating function 226 is configured to generate the output image by masking pixels or pixel areas of the intermediate image corresponding to pixels or pixel areas of the object detection image having a confidence score higher than the adaptive masking threshold.

The first generating function 224 may be configured to generate the intermediate image by downscaling the input image to the intermediate image. The intermediate image resolution is then lower than the input image resolution. In alternative the first generating function 224 may be configured to generate the intermediate image by using the input image as the intermediate image. The intermediate image resolution is then equal to the input image resolution.

The optional further setting function 227 is configured to set a fixed masking threshold independent of a ratio between the output image resolution and the object detection image resolution.

In embodiments including the further setting function 227, the second generating function may be configured to generate:

the output image by masking pixels or pixel areas of the intermediate image corresponding to pixels or pixel areas of the object detection image having a confidence score higher than the adaptive masking threshold for pixels or pixel areas corresponding to objects located closer than a preset distance, and the output image by masking pixels or pixel areas of the intermediate image corresponding to pixels or pixel areas of the object detection image having a confidence score higher than the fixed masking threshold for pixels or pixel areas corresponding to objects located equal to or farther away than the preset distance.

In embodiments including the further setting function 227, the second generating function may be configured to generate:

the output image by masking pixels or pixel areas of the intermediate image corresponding to pixels or pixel areas of the object detection image having a confidence score higher than the adaptive masking threshold, wherein further preset distance is shorter than the preset distance for pixels or pixel areas corresponding to objects located closer than a preset distance and farther away than a further preset distance, and the output image by masking pixels or pixel areas of the intermediate image corresponding to pixels or pixel areas of the object detection image having a confidence score higher than the fixed masking threshold for pixels or pixel areas corresponding to objects located equal to or farther away than the preset distance, or equal to or closer than the further preset distance.

In embodiments including the further setting function 227, the second generating function may be configured to generate:

the output image by masking pixels or pixel areas of the intermediate image corresponding to pixels or pixel areas of the object detection image having a confidence score higher than the adaptive masking threshold for pixels or pixel areas corresponding to objects having a pixel density in the intermediate image above a preset pixel density, and the output image by masking pixels or pixel areas of the intermediate image corresponding to pixels or pixel areas of the object detection image having a confidence score higher than the fixed masking threshold for pixels or pixel areas corresponding to objects having a pixel density in the intermediate image equal to or lower than the preset pixel density.

In embodiments including the further setting function 227, the second generating function may be configured to generate:

the output image by masking pixels or pixel areas of the intermediate image corresponding to pixels or pixel areas of the object detection image having a confidence score higher than the adaptive masking threshold, wherein the further preset pixel density is higher than the preset pixel density for pixels or pixel areas corresponding to objects having a pixel density in the intermediate image above a preset pixel density and below a further preset pixel density, and the output image by masking pixels or pixel areas of the intermediate image corresponding to pixels or pixel areas of the object detection image having a confidence score higher than the fixed masking threshold for pixels or pixel areas corresponding to objects having a pixel density in the intermediate image equal to or lower than the preset pixel density, or equal to or higher than the further preset pixel density.

The detailed description of the acts of the method 100 described in relation to FIG. 1 hereinabove apply also for the corresponding functions of the image processing device 200. Furthermore, the optional additional features of the method 100 described in relation to FIG. 1 hereinabove, when applicable, apply also to the image processing device 200.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method of generating an output image with masking of objects of classes to be masked, the method comprising:

downscaling an input image to an object detection image having a resolution lower than a resolution of the input image and lower than a resolution of the output image;

inputting the object detection image to an object detection module;

receiving, from the object detection module, confidence scores for pixels or pixel areas of the object detection image, each confidence score indicating a respective probability that the pixel or pixel area relates to an object of a class to be masked;

generating, based on the input image, an intermediate image having a resolution higher than the object detection image resolution;

setting an adaptive masking threshold such that the greater a ratio between the output image resolution and the object detection image resolution, the lower the adaptive masking threshold; and generating the output image by masking pixels or pixel areas of the intermediate image corresponding to pixels or pixel areas of the object detection image having a confidence score higher than the adaptive masking threshold.

2. The method according to claim 1, wherein the intermediate image is generated by one of:

downscaling the input image to the intermediate image, wherein the intermediate image resolution is lower than the input image resolution, or using the input image as the intermediate image, wherein the intermediate image resolution is equal to the input image resolution.

3. The method according to claim 1, further comprising:

setting a fixed masking threshold independent of the ratio between the output image resolution and the object detection image resolution, wherein generating the output image comprises:

generating, for pixels or pixel areas corresponding to objects located closer than a preset distance, the output image by masking pixels or pixel areas of the intermediate image corresponding to pixels or pixel areas of the object detection image having a confidence score higher than the adaptive masking threshold; and generating, for pixels or pixel areas corresponding to objects located equal to or farther away than the preset distance, the output image by masking pixels or pixel areas of the intermediate image corresponding to pixels or pixel areas of the object detection image having a confidence score higher than the fixed masking threshold.

4. The method according to claim 1, further comprising:

setting a fixed masking threshold independent of the ratio between the output image resolution and the object detection image resolution, wherein generating the output image comprises:

generating, for pixels or pixel areas corresponding to objects located closer than a preset distance and farther away than a further preset distance, the output image by masking pixels or pixel areas of the intermediate image corresponding to pixels or pixel areas of the object detection image having a confidence score higher than the adaptive masking threshold, wherein further preset distance is shorter than the preset distance; and generating, for pixels or pixel areas corresponding to objects located equal to or farther away than the preset distance, or equal to or closer than the further preset distance, the output image by masking pixels or pixel areas of the intermediate image corresponding to pixels or pixel areas of the object detection image having a confidence score higher than the fixed masking threshold.

5. The method according to claim 1, further comprising:

setting a fixed masking threshold independent of the ratio between the output image resolution and the object detection image resolution, wherein generating the output image comprises:

generating, for pixels or pixel areas corresponding to objects having a pixel density in the intermediate image above a preset pixel density, the output image by masking pixels or pixel areas of the intermediate image corresponding to pixels or pixel areas of the object detection image having a confidence score higher than the adaptive masking threshold; and generating, for pixels or pixel areas corresponding to objects having a pixel density in the intermediate image equal to or lower than the preset pixel density, the output image by masking pixels or pixel areas of the intermediate image corresponding to pixels or pixel areas of the object detection image having a confidence score higher than the fixed masking threshold.

6. The method according to claim 1, further comprising:

setting a fixed masking threshold independent of the ratio between the output image resolution and the object detection image resolution, wherein generating the output image comprises:

generating, for pixels or pixel areas corresponding to objects having a pixel density in the object detection image above a preset pixel density and below a further preset pixel density, the output image by masking pixels or pixel areas of the intermediate image corresponding to pixels or pixel areas of the object detection image having a confidence score higher than the adaptive masking threshold, wherein the further preset pixel density is higher than the preset pixel density; and generating, for pixels or pixel areas corresponding to objects having a pixel density in the object detection image equal to or lower than the preset pixel density, or equal to or higher than the further preset pixel density, the output image by masking pixels or pixel areas of the intermediate image corresponding to pixels or pixel areas of the object detection image having a confidence score higher than the fixed masking threshold.

7. An apparatus having processing capabilities and a non-transitory computer readable storage medium having stored thereon instructions for implementing a method for generating an output image with masking of objects of classes to be masked, the method comprising:

downscaling an input image to an object detection image having a resolution lower than a resolution of the input image and lower than a resolution of the output image;

inputting the object detection image to an object detection module;

receiving, from the object detection module, confidence scores for pixels or pixel areas of the object detection image, each confidence score indicating a respective probability that the pixel or pixel area relates to an object of a class to be masked;

generating, based on the input image, an intermediate image having a resolution higher than the object detection image resolution;

setting an adaptive masking threshold such that the greater a ratio between the output image resolution and the object detection image resolution, the lower the adaptive masking threshold; and generating the output image by masking pixels or pixel areas of the intermediate image corresponding to pixels or pixel areas of the object detection image having a confidence score higher than the adaptive masking threshold.

8. An image processing device for generating an output image with masking of objects of classes to be masked, the image processing device comprising circuitry configured to execute:

a downscaling function configured to downscale an input image to an object detection image having a resolution lower than a resolution of the input image and lower than a resolution of the output image;

an inputting function configured to input the object detection image to an object detection module;

a receiving function configured to receive, from the object detection module, confidence scores for pixels or pixel areas of the object detection image, each confidence score indicating a respective probability that the pixel or pixel area relates to an object of a class to be masked;

a first generating function configured to generate, based on the input image, an intermediate image having a resolution higher than the object detection image resolution;

a setting function configured to set an adaptive masking threshold such that the greater a ratio between the output image resolution and the object detection image resolution, the lower the adaptive masking threshold; and a second generating function configured to generate the output image by masking pixels or pixel areas of the intermediate image corresponding to pixels or pixel areas of the object detection image having a confidence score higher than the adaptive masking threshold.

9. The image processing device according to claim 8, wherein the first generating function is configured to generate the intermediate image by one of:

downscaling the input image to the intermediate image, wherein the intermediate image resolution is lower than the input image resolution, or using the input image as the intermediate image, wherein the intermediate image resolution is equal to the input image resolution.

10. The image processing device according to claim 8, wherein the circuitry is further configured to execute:

a further setting function configured to set a fixed masking threshold independent of the ratio between the output image resolution and the object detection image resolution, wherein the second generating function is configured to:

generate, for pixels or pixel areas corresponding to objects located closer than a preset distance, the output image by masking pixels or pixel areas of the intermediate image corresponding to pixels or pixel areas of the object detection image having a confidence score higher than the adaptive masking threshold; and generate, for pixels or pixel areas corresponding to objects located equal to or farther away than the preset distance, the output image by masking pixels or pixel areas of the intermediate image corresponding to pixels or pixel areas of the object detection image having a confidence score higher than the fixed masking threshold.

11. The image processing device according to claim 8, wherein the circuitry is further configured to execute:

a further setting function configured to set a fixed masking threshold independent of the ratio between the output image resolution and the object detection image resolution, wherein the second generating function is configured to:

generate, for pixels or pixel areas corresponding to objects located closer than a preset distance and farther away than a further preset distance, the output image by masking pixels or pixel areas of the intermediate image corresponding to pixels or pixel areas of the object detection image having a confidence score higher than the adaptive masking threshold, wherein further preset distance is shorter than the preset distance; and generate, for pixels or pixel areas corresponding to objects located equal to or farther away than the preset distance, or equal to or closer than the further preset distance, the output image by masking pixels or pixel areas of the intermediate image corresponding to pixels or pixel areas of the object detection image having a confidence score higher than the fixed masking threshold.

12. The image processing device according to claim 8, wherein the circuitry is further configured to execute:

a further setting function configured to set a fixed masking threshold independent of the ratio between the output image resolution and the object detection image resolution, wherein the second generating function is configured to:

generate, for pixels or pixel areas corresponding to objects having a pixel density in the intermediate image above a preset pixel density, the output image by masking pixels or pixel areas of the intermediate image corresponding to pixels or pixel areas of the object detection image having a confidence score higher than the adaptive masking threshold; and generate, for pixels or pixel areas corresponding to objects having a pixel density in the intermediate image equal to or lower than the preset pixel density, the output image by masking pixels or pixel areas of the intermediate image corresponding to pixels or pixel areas of the object detection image having a confidence score higher than the fixed masking threshold.

13. The image processing device according to claim 8, wherein the circuitry is further configured to execute:

a further setting function configured to set a fixed masking threshold independent of the ratio between the output image resolution and the object detection image resolution, wherein the second generating function is configured to:

generate, for pixels or pixel areas corresponding to objects having a pixel density in the input image above a preset pixel density and below a further preset pixel density, the output image by masking pixels or pixel areas of the intermediate image corresponding to pixels or pixel areas of the object detection image having a confidence score higher than the adaptive masking threshold, wherein the further preset pixel density is higher than the preset pixel density; and generate, for pixels or pixel areas corresponding to objects having a pixel density in the input image equal to or lower than the preset pixel density, or equal to or higher than the further preset pixel density, the output image by masking pixels or pixel areas of the intermediate image corresponding to pixels or pixel areas of the object detection image having a confidence score higher than the fixed masking threshold.

* * * * *